United States Patent [19]
Uenishi et al.

[11] Patent Number: 5,470,616
[45] Date of Patent: Nov. 28, 1995

[54] COATED SHAPED ARTICLES AND METHOD OF MAKING SAME

[75] Inventors: Masamoto Uenishi; Tsukasa Mizobuchi; Masatoshi Takesue; Yukio Kobayashi, all of Nagoya; Shoichi Nagai, Tokyo, all of Japan

[73] Assignee: Mitsubishi Rayon Co., Ltd., Tokyo, Japan

[21] Appl. No.: 305,553

[22] Filed: Sep. 14, 1994

Related U.S. Application Data

[62] Division of Ser. No. 995,712, Dec. 23, 1992, abandoned.

[51] Int. Cl.⁶ ........................................ B05D 3/06
[52] U.S. Cl. ................ 427/515; 427/387; 427/553; 427/558; 428/331; 428/334; 428/336; 428/412; 428/447; 428/451
[58] Field of Search ................ 427/387, 515, 427/553, 558; 428/331, 334, 336, 412, 447, 451

[56] References Cited

U.S. PATENT DOCUMENTS

| | | | |
|---|---|---|---|
| 3,986,997 | 10/1976 | Clark | 428/412 X |
| 4,277,287 | 7/1981 | Frye | 106/287.12 |
| 4,299,746 | 11/1981 | Frye | 428/412 X |
| 4,353,959 | 10/1982 | Olson et al. | 428/331 |
| 4,368,236 | 1/1983 | Frye | 428/412 |
| 4,373,060 | 2/1983 | Ching | 524/767 |
| 4,382,983 | 5/1983 | Yuyama et al. | 427/386 |
| 4,413,088 | 11/1983 | Frye | 524/714 |
| 4,477,528 | 10/1984 | Frye | 428/412 |
| 5,015,523 | 5/1991 | Kawashima et al. | 428/336 |
| 5,139,815 | 8/1992 | Patterson | 427/387 X |

FOREIGN PATENT DOCUMENTS

| | | |
|---|---|---|
| 92122038 | 10/1979 | European Pat. Off. . |
| 2018621 | 10/1979 | European Pat. Off. . |
| 429099 | 11/1990 | European Pat. Off. . |
| 58-157865 | 9/1983 | Japan . |
| 85-174622 | 6/1985 | Japan . |
| 60-103347 | 7/1985 | Japan . |
| 4-327519 | 8/1992 | Japan . |
| 4-234442 | 8/1992 | Japan . |

Primary Examiner—Michael Lusignan
Attorney, Agent, or Firm—Oblon, Spivak, McClelland, Maier, & Neustadt

[57] ABSTRACT

Disclosed are shaped articles having a coating layer formed on surface region, wherein the surface region is formed of a polymer derived from a multifunctional acrylic monomer and having 0.02 to 0.2 μmol/cm² of acidic groups therein, by curing a coating composition consisting essentially of a specific silica polycondensate. The silica polycondensate is obtained by mixing (I) colloidal silica and (II) a specific silicon compound in such a molar ratio that the average number of hydrolyzable groups is within the range of 2.30 to 3.85, and then subjecting them to cohydrolysis and polycondensation. In these shaped articles, the coating layer have excellent properties such as hardness and abrasion resistance, as well as good adhesion.

5 Claims, 3 Drawing Sheets

COATED SHAPED ARTICLES AND METHOD OF MAKING SAME

This is a division of application Ser. No. 07/995,712, filed on Dec. 23, 1992, now abandoned.

BACKGROUND OF THE INVENTION a. Field of the Invention

This invention relates to shaped articles having high surface hardness and a method of making such shaped articles. The shaped articles of the present invention can be used in various fields of application including, for example, the fields of architecture, automobile industry and optics.

b. Description of the Prior Art

Synthetic resin shaped articles made of polymethyl methacrylate resin, polycarbonate resins, diethylene glycol bisallyl carbonate resin and the like are lighter in weight and less expensive than glass products. Owing to these advantages, they are used in a wide variety of applications.

However, since such synthetic resin shaped articles have insufficient surface hardness, their surfaces are easily damaged by contact with other objects, impacts, scratches and the like, resulting in a reduced product yield and a spoiled appearance. Especially where these shaped articles are used as optical lenses, fashion glasses, sunglasses, spectacle lenses (such as correcting lenses), windowpanes and the like, any damage caused to the surfaces thereof diminishes their commercial value and/or makes them unusable in a short period of time. Accordingly, it is strongly demanded to improve the surface hardness of such synthetic resin shaped articles. In order to meet this demand, various attempts have heretofore been made.

In Japanese Patent Publication Nos. 39691/'77, 5554/'87, 157865/'83, 35675/'88, 36349/'88 and 45094/'91, the abrasion resistance of shaped articles are improved by coating them with a coating composition containing a mixture of colloidal silica and a hydrolyzable silicon compound.

In Japanese Patent Publication No. 53701/'85, the abrasion resistance and weather resistance of polycarbonate substrates are improved by forming a thermosetting acrylic polymer layer (primer layer) containing an ultraviolet light absorber on the polycarbonate substrates and then forming thereon a coating layer comprising a mixture of colloidal silica and a hydrolyzable silicon compound.

However, the coating layers disclosed in Japanese Patent Publication Nos. 39691/'77, 5554/'87, 157865/'83, 35675/'88, 36349/'88 and 45094/'91 have the following disadvantages. (1) When they are subjected to a Taber abrasion test according to ASTM D-1044 in which a CS-17 truck wheel is used under a load of 250 g and rotated 5,000 cycles, all of them show a haze of as high as 10 to 50%. Thus, their abrasion resistance is much lower than that of glass plates which show a haze of about 3%. (2) Since the adhesion of the coating layer to the substrate is obtained by dissolving the substrate with a specific solvent, usable substrates are limited by the type of solvent used. (3) The adhesion of the coating layer to the substrate is insufficient. More specifically, the adhesion of the coating layer to the substrate is reduced when the coating layer is subjected to a durability test for a long period of time. Moreover, the structure disclosed in Japanese Patent Publication No. 53701/'85 has the disadvantage that, if the primer layer contains a large amount of ultraviolet light absorber, the adhesion of the primer layer to the substrate is reduced.

SUMMARY OF THE INVENTION

It is a first object of the present invention to provide a coating layer-bearing shaped article which has a crosslinked siloxane network structure represented by (—Si—O—Si—) in the surface thereof, exhibit excellent surface hardness and abrasion resistance, and shows an improvement in the adhesion of the coating layer to various substrates.

It is a second object of the present invention to provide a simplified method of making coating layer-bearing shaped articles having the above-described excellent features.

The above-described first object of the present invention is accomplished by an abrasion-resistant shaped article having a coating layer formed on the surface region, wherein the surface region is formed of a polymer having structural units derived from a multifunctional monomer containing two or more (meth)acryloyloxy groups in the molecule and has 0.02 to 0.2 μmol/cm² of acidic groups therein, by curing a coating composition consisting essentially of a silica polycondensate obtained by mixing (I) colloidal silica and (II) at least one hydrolyzable silicon compound having any of the following general formulas (A) to (F) in such a molar ratio that the average number of hydrolyzable groups calculated from the following equation (1) is within the range of 2.30 to 3.85, and then subjecting them to cohydrolysis and polycondensation.

  (A)

  (B)

  (C)

  (D)

  (E)

  (F)

where $R^1$, $R^2$, $R^3$, $R^5$, $R^6$, $R^8$, $R^9$, $R^{11}$, $R^{12}$, $R^{14}$, $R^{15}$, $R^{17}$ and $R^{18}$ in formulas (A) to (F) are hydrocarbon radicals of 1 to 15 carbon atoms which may have an ether linkage or an ester linkage, $R^4$ in formula (B) is a hydrocarbon radical of 2 to 15 carbon atoms having an epoxy group, $R^7$ in formula (C) is a hydrocarbon radical of 1 to 15 carbon atoms having an amino group, $R^{10}$ in formula (D) is a hydrocarbon radical of 1 to 15 carbon atoms having a mercapto group, $R^{13}$ in formula (E) is a hydrocarbon radical of 2 to 15 carbon atoms having a vinyl group, $R^{16}$ in formula (F) is a hydrocarbon radical of 3 to 15 carbon atoms having a (meth)acryloyloxy group, a, b, d, e, g, h, j, k, m, n, p and q are whole numbers of 0 to 3, c is equal to (4-a-b), f is equal to (4-d-e), i is equal to (4-g-h), 1 is equal to (4-j-k), o is equal to (4-m-n), and r is equal to (4-p-q).

Average number of hydrolyzable groups $$\text{Average number of hydrolyzable groups} = \frac{4[I] + c[A] + f[B] + i[C] + l[D] + o[E] + r[F]}{[I] + [A] + [B] + [C] + [D] + [E] + [F]} \quad (1)$$

where [A] to [F] are the number of moles of the hydrolyzable silicon compounds of the general formulas (A) to (F), respectively, present in the reaction mixture, [I] is the number of moles of the colloidal silica present in the reaction mixture, and c, f, i, l, o and r are the same whole numbers as defined above for the general formulas (A) to (F).

The above-described second object of the present invention is accomplished by a method of making abrasion-resistant shaped articles which comprises the steps of (a) providing a shaped article having a surface formed of a polymer having structural units derived from a multifunctional monomer containing two or more (meth)acryloyloxy groups in the molecule, (b) irradiating the surface of the polymer with ultraviolet light having a wavelength of 300 nm or less, (c) subjecting the irradiated surface to an alkali treatment, (d) coating the irradiated and alkali-treated surface with a coating composition consisting essentially of a silica polycondensate obtained by mixing (I) colloidal silica and (II) at least one hydrolyzable silicon compound having any of the above general formulas (A) to (F) in such a molar ratio that the average number of hydrolyzable groups calculated from the above equation (1) is within the range of 2.30 to 3.85, and then subjecting them to cohydrolysis and polycondensation, and (e) curing the coating composition.

DESCRIPTION OF THE PREFERRED EMBODIMENTS

Figure 1:
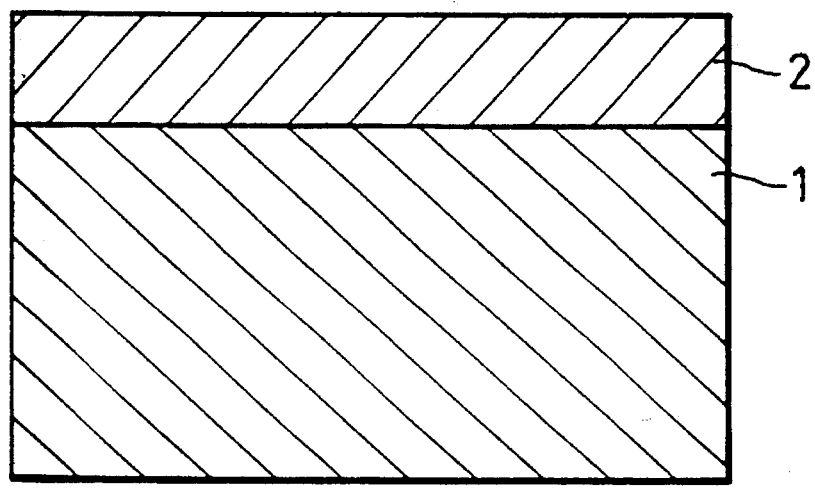
FIG. 1 is a cross-sectional view illustrating a substrate 1 having a polymer layer 2 formed thereon for use in the method of making abrasion-resistant shaped articles in accordance with the present invention.

In the practice of the present invention, a polymer layer 2 (FIG. 1) is first formed by polymerizing a monomer composition containing a multifunctional monomer having two or more (meth)acryloyloxy groups in the molecule. Examples of the multifunctional monomer include 1,4-butanediol di(meth)acrylate, 1,6-hexanediol di(meth)acrylate, neopentyl glycol di(meth)acrylate, ethylene glycol di(meth)acrylate, triethylene glycol di(meth)acrylate, tripropylene glycol di(meth)acrylate, dipropylene glycol di(meth)acrylate, 3-methylpentanediol di(meth)acrylate, diethylene glycol bis(β-(meth)acryloyloxypropionate), trimethylolethane di(meth)acrylate, trimethylolpropane tri(meth)acrylate, pentaerythritol tri(meth)acrylate, dipentaerythritol hexa(meth)acrylate, tri(2-hydroxyethyl) isocyanate di(meth)acrylate, pentaerythritol tetra(meth)acrylate, 2,3-bis(meth)acryloyloxyethyloxymethylbicyclo[2.2.1]heptane, poly-1,2-butadiene di(meth)acrylate, 1,2-bis(meth)acryloyloxymethylhexane, nonaethylene glycol di(meth)acrylate, tetradecaethylene glycol di(meth)acrylate, 10-decanediol di(meth)acrylate, 3,8-bis(meth)acryloyloxymethyltricyclo[5.2.10]decane, hydrogenated bisphenol A di(meth)acrylate, 2,2-bis(4-(meth)acryloyloxydiethoxyphenyl)propane, 1,4-bis((meth)acryloyloxymethyl)cyclohexane, bisphenol A diglycidyl ether di(meth)acrylate and epoxidized bisphenol A di(meth)acrylate. These multifunctional monomers may be used alone or in admixture of two or more.

If necessary, they may be copolymerized with monofunctional monomers. It is desirable that the monomer composition contains such a multifunctional monomer in an amount of not less than 30% by weight. As used herein, the term "(meth)acryloyloxy group" means an acryloyloxy group or a methacryloyloxy group. If a monofunctional monomer alone is used to form a polymer layer, subsequent ultraviolet light irradiation and alkali treatment will fail to produce a sufficient quantity (i.e., within the range of 0.02 to 0.2 μmol/cm$^2$) of acidic groups. Thus, it is an essential feature of the present invention to use a multifunctional monomer.

Then, the polymer layer 2 (FIG. 1) is irradiated with ultraviolet light having a wavelength of 300 nm or less to break a part of the crosslinked molecular chains. Since the bond energy of the crosslinked molecular chains of the polymer layer varies with the composition of the polymer, it is impossible to generally specify the wavelength of ultraviolet light required to break the crosslinked molecular chains. However, it is desirable to use ultraviolet light having a photon energy of about 4 eV or greater. Thus, it is necessary to use ultraviolet light having a wavelength of 300 nm or less which corresponds to the aforesaid photon energy. It is to be understood that a sufficient quantity of acidic groups are not produced by the ultraviolet light irradiation alone.

Figure 3C:
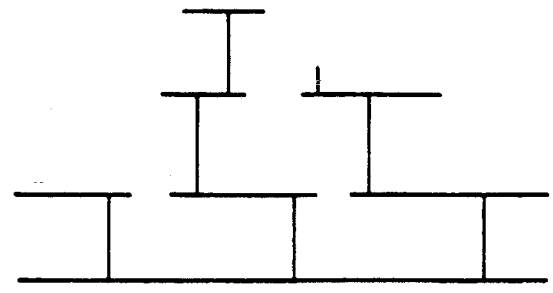
FIG. 3 is a diagram illustrating the state of the polymer structure during ultraviolet light irradiation and alkali treatment steps in the method of the present invention, wherein (a) shows the crosslinked structure, (b) shows the breaking apart of the crosslinked structure after UV irradiation and (c) shows the dissolving of low molecular weight products after alkali treatment.
Figure 3B:
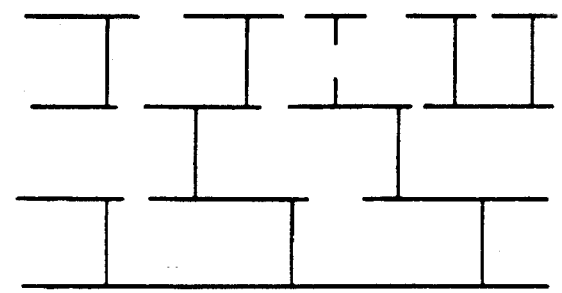
Figure 3A:
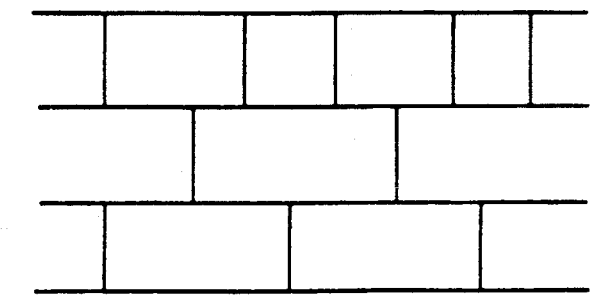

Subsequently, the ultraviolet light-irradiated polymer layer is subjected to an alkali treatment. It is generally said that the hydrolysis of crosslinked polymers proceeds slowly. However, the present inventors have found that, after the polymer layer is reduced to low-molecular-weight fragments by irradiation with a wavelength of 300 nm or less, it is easy to hydrolyze. The mechanism of the reactions which are believed to take place is schematically illustrated in FIG. 3. The aqueous alkaline solutions which can be used for this alkali treatment include, for example, aqueous solutions of sodium hydroxide, potassium hydroxide and the like, and such solutions additionally containing suitable solvents such as alcohols. The optimum conditions of the alkali treatment cannot be generally specified, because they may vary according to the amount of ultraviolet light exposure, and the composition and geometry of the ultraviolet light-irradiated portion of the shaped article. However, sodium hydroxide, for example, is preferably used in the form of an aqueous solution having a concentration of 0.1 to 50% by weight and more preferably 1 to 30% by weight. The temperature for the alkali treatment is generally within the range of 0° to 100° C. and preferably 20° to 80° C. The time for the alkali treatment is generally within the range of 0.01 to 100 hours and preferably 0.1 to 10 hours.

Figure 2:
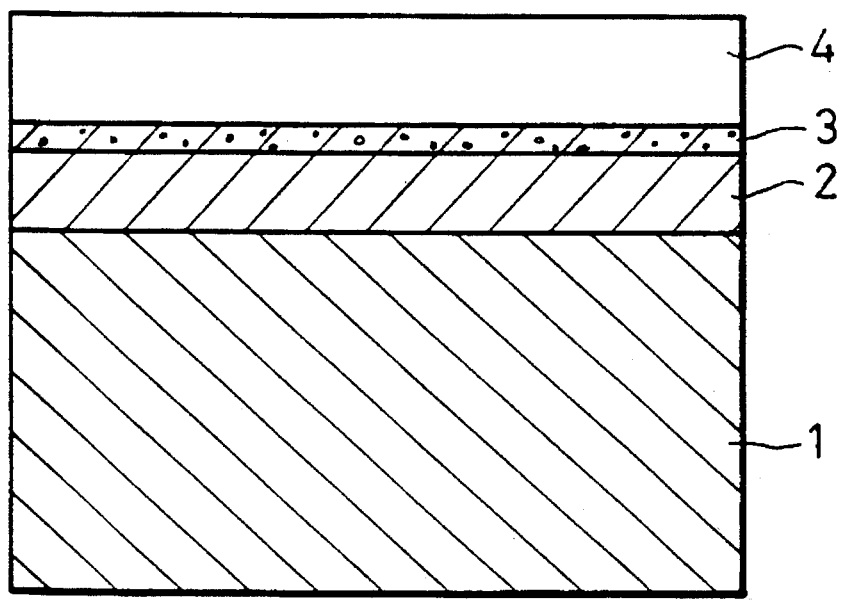
FIG. 2 is a cross-sectional view illustrating the construction of an abrasion-resistant shaped article in accordance with the present invention which has been made by forming a surface region 3 having a specific quantity of acidic groups in the surface of the polymer layer 2 and then forming a coating layer 4 thereon.

In the present invention, that part of the polymer layer 2 in which acidic groups have been produced by the above-described ultraviolet light irradiation and alkali treatment is referred to as a surface region 3 (FIG. 2). This surface region denotes either of (1) the surface part 3 of a polymer layer 2 formed on a substrate 1 from a multifunctional monomer (as illustrated in FIG. 2) and (2) the surface part of a shaped article consisting entirely of a polymer formed from a multifunctional monomer (not shown).

In the former case (1), no particular limitation is placed on the type of the material constituting the substrate 1, but organic polymeric materials are preferred. However, composites consisting of inorganic and organic materials can also be used for the substrate 1. Useful organic materials include acrylic resins, vinyl chloride resin, polycarbonate resins, polyester resins and the like. Where the polymer layer 2 (FIG. 1) is formed by applying a multifunctional monomer as described above to a surface of the substrate 1, the thickness of the polymer layer 2 is preferably not less than 1 μm and more preferably not less than 3 μm.

As used herein, the term "acidic groups" means carboxyl and hydroxyl groups. In the present invention, the quantity of acidic groups is expressed as the number of micromoles of a basic dye which can be adsorbed onto a unit area of the surface region (i.e., in μmol/cm²). This can be obtained according to the following procedure.

(1) A 0.1N sodium acetate buffer solution (pH 4.5) is prepared.

(2) Using this buffer solution, a 1.0 g/l Methyl Violet solution is prepared.

(3) A shaped article measuring 50 mm×50 mm is immersed in the above solution (at 25° C.) for 72 hours.

(4) The shaped article is taken out of the solution and washed with water.

(5) After washing, the shaped article is wiped dry.

(6) The dye is extracted by soaking the shaped article in N,N-dimethylformamide for 24 hours.

(7) The absorbance of the dye extract is measured at a wavelength of 587 nm.

(8) Separately, a calibration curve is constructed by a series of dye solutions in N,N-dimethylformamide. Using this calibration curve, the concentration of the basic dye per unit area of the surface region of the shaped article is determined.

In the present invention, the acidic groups serve to enhance the bonding strength between the surface region 3 and the coating layer 4 (FIG. 2). In order to achieve sufficient bonding strength, 0.02 to 0.2 μmol/cm² of acidic groups are required. In the present invention, the acidic groups are present in the surface region 3 (FIG. 2) and the inner portion of the polymer layer 2 contains few acidic groups.

If the polymer layer 2 (FIG. 1) is subjected to other conventional procedures for introducing acidic groups (such as plasma treatment, photo-initiated graft polymerization and chromium treatment), in place of the procedure of the present invention comprising a combination of ultraviolet light irradiation and alkali treatment, good results may not be obtained with respect to the quantity of acidic groups and the ease of operation. After the alkali treatment, the shaped article is usually washed with water. If necessary, the shaped article may be neutralized by washing with an inorganic or organic acid. The acidic groups so produced neither show any change in quantity even when heated at 80° C. for 100 hours, nor bury themselves.

Subsequently, the surface region 3 (FIG. 2) is coated with a coating composition consisting essentially of a silica polycondensate obtained by mixing colloidal silica and at least one hydrolyzable silicon compound having any of the following general formulas (A) to (F) in such a molar ratio that the average number of hydrolyzable groups calculated from the following equation (1) is within the range of 2.30 to 3.85, and then subjecting them to cohydrolysis and polycondensation in the presence of water and an organic solvent (and a hydrolysis catalyst and a condensation catalyst, if necessary). Then, the coating composition is heat-treated to further enhance the degree of polymerization of the silica polycondensate and thereby form a coating layer 4 (FIG. 2).

  (A)

  (B)

  (C)

  (D)

  (E)

  (F)

where $R^1$ to $R^{18}$ and a to r are as previously defined.

Average number of hydrolyzable groups $$\text{Average number of hydrolyzable groups} = \frac{4[I] + c[A] + f[B] + i[C] + l[D] + o[E] + r[F]}{[I] + [A] + [B] + [C] + [D] + [E] + [F]} \quad (1)$$

where [I], [A] to [F] and c to r are as previously defined. During this process, the hydroxyl, epoxy, amino and/or mercapto groups possessed by the components of the coating layer 4 (FIG. 2) chemically react with the acidic groups present in the surface region 3 (FIG. 2) to form chemical bonds and further improve such properties as adhesion.

On the other hand, the crosslink density of the polymer layer 2 (FIG. 2) is maintained at the same level as was attained during polymerization. These properties of the polymer layer 2 and the coating layer 3 cooperate to produce a shaped article which, as a whole, has very good abrasion resistance and durability. It is desirable that the thickness of the surface region 3 extending from the outermost surface toward the inside is within the range of 0.01 to 1 μm. If the thickness of the surface region 3 having acidic groups is greater than 1 μm, the desired hardness may not be obtained, and if it is less than 0.01 μm, the coating layer will have poor adhesion due to the shortage of acidic groups.

Where silicon compounds within the scope of the above general formulas (A) to (D) are used, heating means can be used to cure the coating composition applied to the surface region and thereby form a coating layer as will be specifically described later. The silicon compounds represented by the general formula (A) include, for example, tetramethoxysilane, tetraethoxysilane, tetrapropoxysilane, tetrabutoxysilane, methyltriethoxysilane, ethyltrimethoxysilane, ethyltriethoxysilane and phenyltrimethoxysilane.

The silicon compounds represented by the general formula (B) include, for example, glycidoxymethyltrimethoxysilane, glycidoxymethyltriethoxysilane, β-glycidoxyethyltriethoxysilane, γ-glycidoxypropyltrimethoxysilane and γ-glycidoxypropyltriethoxysilane.

The silicon compounds represented by the general formula (C) include, for example, aminomethyltrimethoxysilane, aminomethyltriethoxysilane, aminomethyltripropoxysilane, aminomethyltributoxysilane, aminoethyltrimethoxysilane, aminoethyltriethoxysilane, aminoethyltripropoxysilane, aminoethyltributoxysilane, aminopropyltrimethoxysilane, aminopropyltriethoxysilane, aminopropyltripropoxysilane, aminopropyltributoxysilane, N-aminomethyl-aminomethyltrimethoxysilane, N-aminomethyl-aminomethyltriethoxysilane, N-aminomethylaminomethyltripropoxysilane, N-aminomethyl-aminomethyltributoxysilane, N-β-aminoethyl-β-aminoethyltrimethoxysilane, N-β-aminoethyl-β-aminoethyltriethoxysilane, N-β-aminoethyl-β-aminoethyltripropoxysilane and N-β-aminoethyl-β-aminoethyltributoxysilane.

The silicon compounds represented by the general formula (D) include, for example, γ-mercaptopropyltrimethoxysilane, γ-mercaptopropyltriethoxysilane, γ-mercaptopropyltripropoxysilane, γ-mercaptopropyltributoxysilane, mercaptomethyltrimethoxysilane, mercaptomethyltriethoxysilane, mercaptomethyltripropoxysilane, mercaptomethyltributoxysilane, mercaptoethyltrimethoxysilane and mercaptoethyltriethoxysilane.

Where silicon compounds within the scope of the above general formulas (E) and (F) are used, not only heating means but also actinic radiation exposure means can be used to cure the coating composition and thereby form a coating layer.

The silicon compounds represented by the general formula (E) include, for example, vinyltrimethoxysilane, vinyltriethoxysilane, vinyltripropoxysilane and vinyltributoxysilane.

The silicon compounds represented by the general formula (F) include, for example, methacryloyloxymethyltrimethoxysilane, methacryloyloxymethyltriethoxysilane, methacryloyloxymethyltripropoxysilane, methacryloyloxymethyltributoxysilane, methacryloyloxyethyltrimethoxysilane, methacryloyloxyethyltriethoxysilane, methacryloyloxyethyltripropoxysilane, methacryloyloxyethyltributoxysilane, methacryloyloxypropyltrimethoxysilane, methacryloyloxypropyltriethoxysilane, methacryloyloxypropyltripropoxysilane, methacryloyloxypropyltributoxysilane, acryloyloxymethyltrimethoxysilane, acryloyloxymethyltriethoxysilane, acryloyloxymethyltripropoxysilane, acryloyloxymethyltributoxysilane, acryloyloxyethyltrimethoxysilane, acryloyloxyethyltriethoxysilane, acryloyloxyethyltripropoxysilane, acryloyloxyethyltributoxysilane, acryloyloxypropyltrimethoxysilane, acryloyloxypropyltriethoxysilane, acryloyloxypropyltripropoxysilane and acryloyloxypropyltributoxysilane.

Also useful are silicon compounds obtained by replacing the trialkoxysilane groups in the foregoing compounds with dimethoxymethylsilane, dimethoxyethylsilane, dimethoxypropylsilane, diethoxymethylsilane, diethoxyethylsilane, diethoxypropylsilane, dimethoxybutylsilane, diethoxybutylsilane, dibutoxymethylsilane, dipropoxyethylsilane, dipropoxypropylsilane, dipropoxybutylsilane, dibutoxymethylsilane, dibutoxyethylsilane, dibutoxypropylsilane, dibutoxybutylsilane and like groups.

Colloidal silica (i.e., silica particles) is commercially available as a "colloidal silica solution" comprising silica particles dispersed in water or an alcohol/water mixture. In order to improve the dispersion stability of the silica particles, this solution is adjusted to an acidic or alkaline pH. In the present invention, the optimum particle diameter of colloidal silica (or silica particles), the content of silica particles in the colloidal silica solution (i.e., its solid content), and the pH of the colloidal silica solution may be chosen as desired. In particular, the optimum colloidal silica solution may vary according to the type of hydrolyzable silicon compound used. Usable commercial products include Cataloid S (solid content 20–30 wt. %; pH 8–10; manufactured by Catalysts and Chemicals Industries Co., Ltd.), OSCAL-1432 (solid content 30 wt. %; pH 2–3; manufactured by Shokubai Kasei Kogyo K.K.), Snowrex C (solid content 30 wt. %; pH 8–10; manufactured by Nissan Chemical Industries, Ltd.), IPA-ST (solid content 30 wt. %; pH 2–3; manufactured by Nissan Chemical Industries, Ltd.) and the like. All of these commercially available colloidal silicas have an average particle diameter of 10–20 μm.

Colloidal silica (i.e., silica particles) may be used in such an amount that the average number of hydrolyzable groups (as will be described later) is within the range of 2.30 to 3.85. Moreover, in the silica polycondensate-forming composition comprising colloidal silica (I) and at least one hydrolyzable silicon compound (II), colloidal silica (I) is desirably present in an amount of 10 to 40% by weight. If the amount of colloidal silica (I) is less than 10% by weight, the surface hardness of the coating layer tends to be insufficient. If the amount of colloidal silica (I) is greater than 40% by weight, the coating layer tends-to produce cracks in a severe environment.

The hydrolyzable silicon compounds which can be used as component (II) are divided into four classes according to the number of hydrolyzable groups in the molecule. They range from monofunctional silicon compounds having one hydrolyzable group to tetrafunctional silicon compounds having four hydrolyzable groups. In the present invention, the weight proportion of colloidal silica (I) and the hydrolyzable silicon compound (II) is limited on the basis of experimental results, assuming that (a) hydrolyzable silicon compounds are completely hydrolyzed in a solution and their hydrolyzable groups are all converted to —OH groups and (b) colloidal silica is considered to be a tetrafunctional silicon compound. The average number of hydrolyzable groups is a value calculated from the above equation (1) and corresponds to the average crosslink density of the silica polycondensate (the coating layer) cured by heat treatment. In the present invention, as described previously, colloidal silica (I) and the hydrolyzable silicon compound (II) are mixed in such a molar ratio that the average number of hydrolyzable groups is within the range of 2.30 to 3.85. If the average number of hydrolyzable groups is greater than 3.85, the heat-treated coating layer is subject to cracking, and if the average number of hydrolyzable groups is less than 2.30, the heat-treated coating layer does not have sufficient abrasion resistance. Preferably, an average number of hydrolyzable groups within the range of 3.30 to 3.60 is used to obtain a coating layer having excellent abrasion resistance and durability.

Then, a silica polycondensate is obtained by subjecting the above-described mixture to cohydrolysis and polycondensation. This cohydrolysis and polycondensation can be effected by stirring the mixture in the presence of water and an organic solvent (and a hydrolysis catalyst and a condensation catalyst, if necessary) at a temperature ranging from room temperature to the reflux temperature for a period of about 1 to 10 hours. Where a compound having the general formula (A), (B), (D), (E) or (F) is used as the hydrolyzable silicon compound (II), it is desirable to adjust the mixture to a pH of 4 to 5 in that the mixture is hydrolyzed rapidly and can be stored for a long period of time. This pH adjustment can be made by adding an acid as a hydrolysis catalyst. Specific examples of useful acids include citric acid, benzoic acid, acetic acid, hydrochloric acid and nitric acid. Where a compound having the general formula (C) is used, such an acid need not be used.

The condensation catalyst which is used as required is a latent catalyst which is inactive, for example, in the form of a solution but manifests its effect upon heating, and can be selected from amine salts of carboxylic acids and quaternary ammonium salts of carboxylic acids. Specific examples thereof include dimethylamine acetate, ethanolamine acetate, dimethylaniline formate, tetraethylammonium benzoate, sodium acetate and sodium propionate. The condensation catalyst is preferably used in an amount of about 0.05 to 1% by weight based on the total weight of the mixture.

The amount of water added for hydrolysis may be any suitable amount that is sufficient for hydrolysis.

The organic solvents which can be used for purposes of cohydrolysis and polycondensation include alcohols such as methyl alcohol, ethyl alcohol and isopropyl alcohol; ketones such as acetone and methyl ethyl ketone; and ethers such as tetrahydrofuran.

The coating composition used in the present invention consists essentially of the silica polycondensate obtained by the above-described cohydrolysis and polycondensation. If desired, a catalyst which promotes the reaction between the acidic groups present in the surface region and the functional groups (i.e., epoxy, amino and/or mercapto groups) possessed by the hydrolyzable silicon compounds may be added to the coating composition. For example, in order to promote reaction with epoxy groups, there may be used a perchloric acid compound which is known as a catalyst for the ring-opening of epoxy groups. Specific examples of such perchloric acid compounds include ammonium perchlorate, perchloric acid, magnesium perchlorate, potassium perchlorate, sodium perchlorate, zinc perchlorate and aluminum perchlorate.

Furthermore, as described in Japanese Patent Publication No. 28094/'88, an alkyl (meth)acrylate polymer may also be added to the coating composition in order to further improve the adhesion of the coating layer without impairing its appearance (e.g., transparency and smoothness). The alkyl (meth)acrylate polymer preferably has a molecular weight characterized by an intrinsic viscosity [η] within the range of 0.01 to 0.30 g/l and can be a homopolymer of a monomer selected from alkyl (meth)acrylates having an alkyl group of 1 to 8 carbon atoms or a copolymer of such monomers. Specific examples of the alkyl (meth)acrylate polymer include homopolymers and copolymers of methyl (meth)acrylate, ethyl (meth)acrylate, propyl (meth)acrylate, butyl (meth)acrylate, isobutyl (meth)acrylate, amyl methacrylate, hexyl methacrylate, octyl methacrylate, 2-ethyl-1-hexyl (meth)acrylate, 3-pentyl acrylate, 3-methyl-1-hexyl (meth)acrylate and 3-methyl-1-butyl (meth)acrylate. These polymers may be used alone or in admixture of two or more.

In order to apply the above-described coating composition to the surface region, there may be employed any of various techniques such as spray coating, spin coating and dip coating. However, dip coating is preferred for shaped articles having a simple configuration and spray coating is preferred for shaped articles having a complex configuration.

Then, the coating composition applied to the surface region is cured according to any conventional method to form a coating layer. During this process, the reactive functional groups present in the silica polycondensate (for example, the epoxy, amino and/or mercapto groups possessed by the compounds of the general formulas (A) to (F)) chemically react with the acidic groups (carboxyl and hydroxyl groups) present in the surface region, resulting in enhanced adhesion. Useful conventional methods include the application of heat and exposure to actinic radiation such as ultraviolet light and γ rays.

Where any of the hydrolyzable silicon compounds represented by the general formulas (A) to (F) is used, the coating layer can be formed through curing by the application of heat. This can be done, for example, by heating the coated shaped article in an oven at 100°–130° C. for a period of time ranging from about 10 minutes to about 10 hours.

Where a vinyl- or (meth)acryloyloxy-containing silicon compounds of the general formulas (E) or (F) is used, the coating layer can advantageously be formed through curing by exposure to actinic radiation. This exposure to actinic radiation can be carried out under any suitable conditions that are well known in the art.

After being cured by the application of heat or by exposure to actinic radiation, the coating layer may have a thickness of 1 to 30 μm and preferably 1 to 10 μm. If the thickness of the coating layer is less than 1 μm, the resulting shaped article does not have sufficient surface hardness and abrasion resistance. If the thickness of the coating layer is greater than 30 μm, the coating layer shows a reduction in adhesion and tends to produce cracks.

The present invention is more specifically explained with reference to the following examples. In these examples, the coated shaped articles were evaluated according to the following procedure.

1. Abrasion resistance

Using a Taber abrader (manufactured by Toyo Seiki Seisakusho K.K.), a CS-17 truck wheel was pressed against a sample under a load of 250 g and rotated 1,000, 3,000 and 5,000 cycles. Thereafter, the sample was washed with a neutral detergent and its total light transmittance (Tt) and haze (H) were measured with a Model HR-100 transmissometer (manufactured by Murakami Color Technology Laboratory).

2. Adhesion

The adhesion of the coating layer of a sample was evaluated by an adhesive tape peeling test. Specifically, by cutting the surface of the sample with a cutter knife at intervals of 1.5 mm, 11 parallel cuts were made in each of two orthogonal directions to form a total of 100 squares in the coating layer. A strip of cellophane adhesive tape (manufactured by Nichiban Co., Ltd.) was applied to the squares under pressure and peeled off upward and quickly. Of the 100 squares, the number of the unremoved squares was counted and used as an index to the adhesion of the coating layer.

3. Durability (a) Thermal shock test

Using a thermal shock tester, a sample was subjected to thermal cycles each comprising exposure to an atmosphere at −30° C. for 2 hours and then at 80° C. for 3 hours. After the sample was subjected to 5 thermal cycles, its appearance was examined and its total light transmittance (Tt) and haze (H) were measured.

(b) Accelerated weathering test

Using a sunshine weatherometer (manufactured by Suga Testing Machines Co., Ltd,) having a black panel temperature of 63° C., a sample was subjected to a 500 hour weathering test in which the sample was cyclically exposed to water spray for 12 minutes and dried for 48 minutes. Thereafter, its adhesion was evaluated and its appearance was visually examined for changes.

(c) Water immersion test

A sample was immersed in warm water at 60° C. for 100 hours. Thereafter, the adhesion and abrasion resistance of the sample were evaluated.

Formation of substrates having acidic groups in the surface region thereof:

(1) Monomer solutions were prepared by adding 35 parts by weight of isopropyl alcohol and 20 parts by weight of toluene to 45 parts by weight of each of monomer compositions No. 1 to 5 shown in Table 1. Substrates were dipped into each of the monomer solutions and then taken out at a speed of 1 m/min to form a monomer solution film on the surfaces thereof. The substrates comprised polymethyl methacrylate (PMMA) plates (commercially available from Mitsubishi Rayon Co., Ltd. under the trade name of Acrylite L) and polycarbonate (PC) plates (commercially available from Mitsubishi Rayon Co., Ltd. under the trade name of Dialite).

Figure 4:
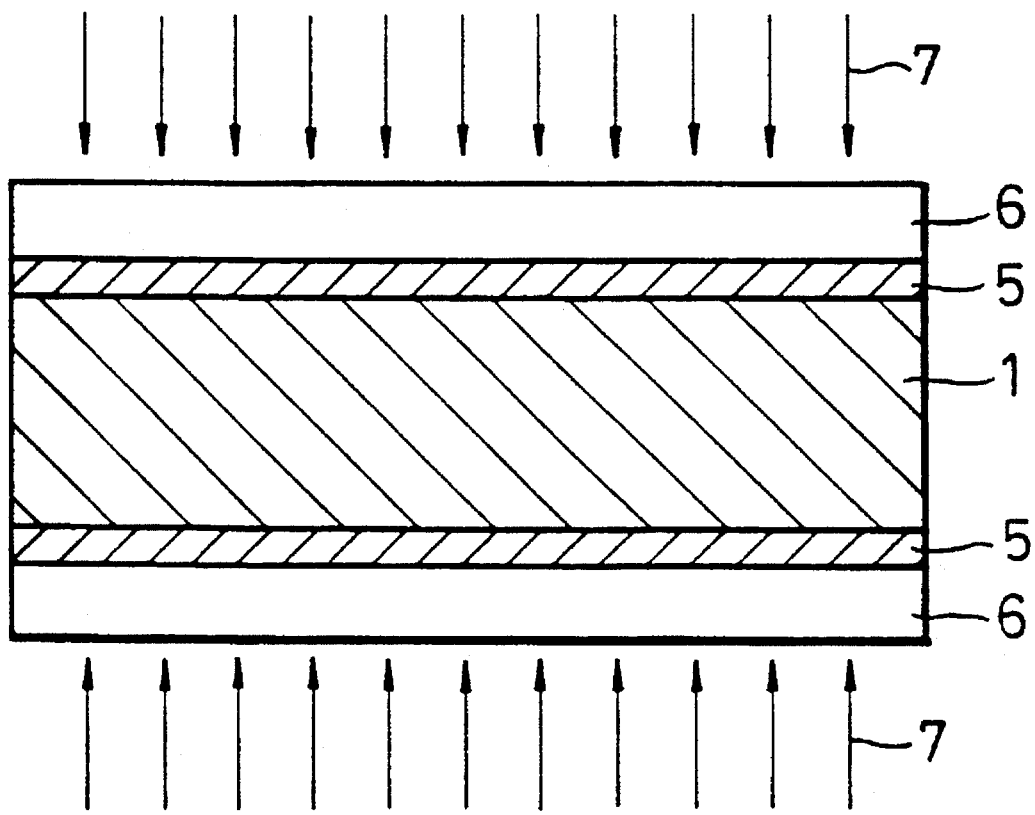
FIG. 4 is a cross-sectional view illustrating an instance of the ultraviolet light irradiation step in which the polymer layers formed on both sides of a substrate are irradiated with ultraviolet light through a glass plate.

Then, as illustrated in FIG. 4, each substrate with the monomer solution film thereon was sandwiched between two glass plates (commercially available under the trade name of BK-7) having a thickness of 1.5 mm, and irradiated from outside the glass plates with ultraviolet light from a high-pressure mercury vapor lamp to effect photopolymerization of the monomers. The reason why the substrate was covered with the glass plates is that the monomer solution film can be cured only in the absence of air. Under these conditions, ultraviolet light having wavelengths shorter than 300 nm was absorbed by the glass plates. The integrated energy of ultraviolet light at 365 nm was 2,508 mJ/cm$^2$ and the thickness of the photocured polymer layer 2 (FIG. 1) was 20 µm. For purposes of irradiation, there was used a Model UV5003 Ultraviolet Light Irradiator (manufactured by Mitsubishi Rayon Engineering Co., Ltd.). This light source emits ultraviolet light having a principal wavelength of 365 nm and also wavelengths of 300 nm or less. The integrated energy of ultraviolet light was measured by means of a Model UV-350 Ultraviolet Actinometer (manufactured by Oak Seisakusho K.K.). This actinometer (Model UV-350) has a peak sensitivity wavelength of 360 nm and a measurable wavelength range of 320–390 nm.

(2) Using a high-pressure mercury vapor lamp, the polymer layer formed as described in paragraph (1) was irradiated with ultraviolet light containing short-wavelength light of 300 nm or less to partially break the crosslinked molecular chains. For this purpose, the surface of the polymer layer was directly exposed to ultraviolet light from the high-pressure mercury vapor lamp. The integrated energies of ultraviolet light applied to the polymer layer are shown in Table 1. For purposes of irradiation, the same ultraviolet light irradiator (Model UV5003) as described above was used. The integrated energies of ultraviolet light were measured by means of Model UV-350 and Model UV-350-25 Ultraviolet Actinometers (manufactured by Oak Seisakusho K.K.). The latter actinometer (Model UV-350-25) has a peak sensitivity wavelength of 254 nm and a measurable wavelength range of 241–271 nm.

Then, the ultraviolet light-irradiated polymer layer was hydrolyzed by soaking it in a 10–20 wt. % aqueous solution of sodium hydroxide (having a temperature of 25°–50° C.). The conditions of hydrolysis and the measured quantity of acidic groups so produced are shown in Table 1.

As can seen from the data marked with (A), (E), (I), (M) and (R), the quantity of acidic groups was insufficient when no alkali treatment of the polymer layer was performed.

Preparation of coating composition solutions:

<Coating composition solution Nos. I–III>

A colloidal silica solution containing 30 wt. % of colloidal silica dispersed in isopropyl alcohol (commercially available from Nissan Chemical Industries, Ltd. under the trade name of IPA-ST), γ-glycidoxypropyltrimethoxysilane (commercially available from Toshiba Silicone Co., Ltd. under the trade name of TSL-8350), first-class grade tetraethoxysilane (commercially available from Katayama Chemical Industry Co., Ltd.), γ-glycidoxypropylmethyldiethoxysilane (commercially available from Shin-Etsu Chemical Co., Ltd. under the trade name of KBE-402), isopropyl alcohol and 1/1000N hydrochloric acid were mixed according to each of the formulations shown in Table 2. This mixture was heated to 70° C. and stirred at that temperature for 7 hours. After the resulting solution was cooled to room temperature, magnesium perchlorate was added thereto as a catalyst for the ring-opening of epoxy groups, and dissolved therein to prepare a coating composition solution. The average numbers of hydrolyzable groups of coating composition solution Nos. I–III, as calculated from the above equation (1), are shown in Table 2. These coating composition solution Nos. I–III were all adjusted to pH 4.5.

<Coating composition solution No. IV>

15.7 g of N-(β-aminoethyl)aminopropyltrimethoxysilane (commercially available from Shin-Etsu Chemical Co., Ltd. under the trade name of KBM-603), 50.0 g of γ-glycidoxypropyltrimethoxysilane (TSL-8350), 56.0 g of an isopropyl alcohol-dispersed colloidal silica solution (IPA-ST), 547.4 g of isopropyl alcohol and 4.3 g of purified water were mixed, and this mixture was stirred at room temperature (25° C.) for 7 hours. In order to promote hydrolysis and polycondensation, the resulting solution was allowed to stand at room temperature for 5 days and used as a coating composition solution. The average number of hydrolyzable groups of this solution was 3.5. The silane compound TSL-8350 was used in an amount equal to its epoxy equivalent. The solids content of the solution at the time of mixing was 13.0% by weight based on its total weight. The reason why the above-described formulation was used is that, if the solids content at the time of mixing is greater than 20% by weight and the amount of water added is greater than 30% by weight of the stoichiometric amount required for hydrolysis, the shelf-life of the solution will become extremely short. When stored at room temperature, this solution remained colorless and clear for 10 days after preparation, but became increasingly turbid from then on.

<Coating composition solution No. V>

270.0 g of γ-mercaptopropyltrimethoxysilane (KBM-803), 162.0 g of γ-glycidoxypropyltrimethoxysilane (TSL-8350), 412.0 g of an isopropyl alcohol-dispersed colloidal silica solution (IPA-ST) and 222.5 g of 1/1000N hydrochloric acid were mixed, and this mixture was stirred at room temperature (25° C.) for an hour. Then, the resulting solution was stirred at 70° C. for 3 hours to promote hydrolysis. After the solution was cooled again to room temperature, 3.0 g of magnesium perchlorate was dissolved therein to prepare a coating composition solution. The average number of hydrolyzable groups of this solution was 3.50 and its solids content at the time of mixing was 30% by weight based on its total weight.

<Coating composition solution No. VI>

70.0 g of γ-methacryloyloxypropyltrimethoxysilane (commercially available from Nippon Unicar Co., Ltd. under the trade name of A-174), 100.0 g of an isopropyl alcohol-dispersed colloidal silica solution (IPA-ST) and 30.2 g of 1/1000N hydrochloric acid were mixed. This mixture was stirred at 70° C. for 3 hours to promote hydrolysis. After the resulting solution was cooled again to room temperature, 0.5 g of benzoin isopropyl ether and 0.5 g of methyl phenyl glyoxylate were added thereto as photo-initiators to prepare a coating composition solution. The average number of hydrolyzable groups of this solution was 3.641.

Examples 1–18

In Examples 1–5, 7–15, 17 and 18, a resin plate having acidic groups (one of (A) to (U) in Table 1) was dipped into one of coating composition solution Nos. I–V and taken out at a speed of 50 cm/min. Then, the coated resin plate was cured in an oven at 105° C. for 3 hours to obtain a coated shaped article. In Examples 6 and 16, a resin plate having acidic groups ((D) or (Q) in Table 1) was dipped into coating composition solution No. VI and taken out at a speed of 1 m/min. In order to evaporate the solvent from the coating film, the coated resin plate was allowed to stand in an oven at 80° C. for 5 minutes. Then, using an ultraviolet light irradiator (UV-5003), the coated resin plate was irradiated with 365 nm ultraviolet light having an energy of 3,000 mJ/cm² to obtain a coated shaped article. The results of evaluation of the coated shaped articles thus obtained are shown in Table 3.

Comparative Example 1

According to the formulation for coating composition solution VII shown in Table 4, various ingredients (i.e., IPA-ST, GPTMSi, TEOSi, IPA and 1/1000N HCl) were mixed. This mixture was heated to 70° C. and stirred at that temperature for 7 hours. After the resulting solution was cooled to room temperature, magnesium perchlorate (in the amount shown in Table 4) was added thereto as a catalyst for the ring-opening of epoxy groups and dissolved therein to prepare a coating composition solution. A resin plate ((C) in Table 1) was dipped into this coating composition solution and taken out at a speed of 1 m/min. The coated resin plate was thermally cured in an oven at 105° C. for 3 hours. After heat treatment, however, the resulting coating layer was found to be cracked.

Comparative Example 2

According to the formulation for coating composition solution VIII shown in Table 4, various ingredients (i.e., IPA-ST, GPDMSi, IPA and 1/1000N HCl) were mixed. This mixture was heated to 70° C. and stirred at that temperature for 7 hours. After the resulting solution was cooled to room temperature, magnesium perchlorate (in the amount shown in Table 4) was added thereto as a catalyst for the ring-opening of epoxy groups and dissolved therein to prepare a coating composition solution. A resin plate ((C) in Table 1) was dipped into this coating composition solution and taken out at a speed of 1 m/min. The coated resin plate was thermally cured in an oven at 105° C. for 3 hours. The resulting coating layer was not smooth because of poor leveling properties and was found to lack abrasion resistance in that the coating layer was easily damaged by #0000 steel wool pressed against it.

Comparative Examples 3–7

The results of evaluation of several shaped articles outside the scope of the present invention are shown in Table 5. In Comparative Example 3, a resin plate ((A) in Table 1) having an insufficient quantity of acidic groups was coated with coating composition solution No. III. In Comparative Example 4, a polymethyl methacrylate (PMMA) plate (commercially available from Mitsubishi Rayon Co., Ltd. under the trade name of Acrylate L) was coated di rectly with coating composition solution No. III. In Comparative Examples 5–7, the results of abrasion tests with commercially available surface-hardened plates and a glass plate. Acrylite MR is a surface-hardened acrylic resin plate manufactured by Mitsubishi Rayon Co., Ltd. and Dialite SH is a surface-hardened polycarbonate plate manufactured by Mitsubishi Rayon Co., Ltd. The glass plate is a commercial product (sold under the trade name of BK-7) having a thickness of 2 mm.

TABLE 1

(Substrates (A) to (U) having acidic groups thereon)

| | | Polymer layer | | Surface region | | | | Quantity of acidic groups ($\times 10^{-2}$ μmol/cm²) |
| | | | | Integrated energy of ultraviolet light for breaking of molecular chains (mJ/cm²) | | Aqueous NaOH solution for alkali treatment | | |
| | | Monomer composition | | | | | | |
| No. | Substrate | Monomers | wt. % | 365 nm | 254 nm | Temperature (°C.) | Concentration (wt. %) | Soaking time (hr) | |
| 1 | PMMA | 1,6-Hexanediol diacrylate | 60 | 3762 | 1500 | 50 | 10 | 0 | 7.0 (A) |
| | | Equimolar condensate of trimethylolethane/acrylic acid/succinic acid | 39 | | | | | 0.5 | 40.0 (B) |
| | | | | | | | | 1.0 | 80.0 (C) |
| | | | | | | | | 1.5 | 100.2 (D) |
| | | Photo-initiator (Darocur 1173) | 1 | | | | | | |
| 2 | PMMA | Dipentaerythritol hexaacrylate | 50 | 3762 | 1500 | 25 | 20 | 0 | 8.0 (E) |
| | | 1,6-Hexanediol diacrylate | 49 | | | | | 1.0 | 50.1 (F) |
| | | | | | | | | 2.0 | 61.8 (G) |
| | | | | | | | | 24.0 | 37.2 (H) |
| | | Photo-initiator (Darocur 1173) | 1 | | | | | | |
| 3 | PMMA | Neopentylglycol diacrylate | 50 | 3762 | 1500 | 25 | 10 | 0 | 5.0 (I) |
| | | Trimethylolpropane triacrylate | 10 | | | | | 0.5 | 50.2 (J) |
| | | 1,6-Hexanediol diacrylate | 20 | | | | | 1.0 | 70.5 (K) |
| | | Pentaerythritol triacrylate | 19 | | | | | 2.0 | 42.5 (L) |
| | | Photo-initiator (Darocur 1173) | 1 | | | | | | |
| 4 | PC | 1,6-Hexanediol diacrylate | 60 | 3762 | 1500 | 25 | 10 | 0 | 7.5 (M) |
| | | Equimolar condensate of trimethylolethane/acrylic acid/succinic | 39 | | | | | 0.5 | 77.2 (N) |
| | | | | | | | | 1.0 | 75.9 (O) |
| | | | | | | | | 2.0 | 77.7 (P) |
| | | | | | | | | 24.0 | 51.0 (Q) |

TABLE 1-continued (Substrates (A) to (U) having acidic groups thereon)

| | | Polymer layer | | Surface region | | | | | Quantity of acidic groups ($\times 10^{-2}$ μmol/cm$^2$) |
|---|---|---|---|---|---|---|---|---|---|
| | | Monomer composition | | Integrated energy of ultraviolet light for breaking of molecular chains (mJ/cm$^2$) | | Aqueous NaOH solution for alkali treatment | | | |
| No. | Substrate | Monomers | wt. % | 365 nm | 254 nm | Temperature (°C.) | Concentration (wt. %) | Soaking time (hr) | |
| 5 | PC | acid<br>Photo-initiator<br>(Darocur 1173)<br>Dipentaerythritol<br>hexaacrylate<br>1,6-Hexanediol<br>diacrylate<br>Photo-initiator<br>(Darocur 1173) | 1<br><br><br>50<br><br>49<br><br>1 | 3762 | 1500 | 25 | 20 | 0<br>1.0<br>2.0<br>24.0 | 8.0(R)<br>50.5(S)<br>51.5(T)<br>37.2(U) |

TABLE 2

(Coating composition solution Nos. I–III)

| | Formulation of coating composition solution | | | | | | | |
|---|---|---|---|---|---|---|---|---|
| Coating composition solution No. | Colloidal silica solution (IPA-ST) (g) | Hydrolyzable silicon compounds | (g) | 1/1000 N HCl (hydrolysis catalyst) (g) | Mg(ClO$_4$)$_2$ (ring-opening catalyst) (g) | IPA (g) | Aging conditions | Average number of hydrolyzable groups |
| I | 250.0 | GPTMSi<br>TEOSi<br>GPDMSi | 33.8<br>100.0<br>70.3 | 107.8 | 3.6 | 282.0 | 70° C., 7 hr | 3.643 |
| II | 250.0 | GPTMSi<br>TEOSi<br>GPDMSi | 22.5<br>100.0<br>80.5 | 105.5 | 3.6 | 282.0 | 70° C., 7 hr | 3.610 |
| III | 250.0 | GPTMSi<br>TEOSi<br>GPDMSi | 11.3<br>100.0<br>90.5 | 103.5 | 3.6 | 282.0 | 70° C., 7 hr | 3.602 |

GPTMSi: γ-Glycidoxypropyltrimethoxysilane.
TEOSi: Tetraethoxysilane.
GPDMSi: γ-Glycidoxypropylmethyldimethoxysilane.
IPA: Isopropyl alcohol.

TABLE 3

(Evaluation of performance of coated shaped articles)

| Ex. No. | Sub-strate* | Coating composition solution No. | Thickness of coating layer (μm) | Initial performance Adhesion | Tt (%) | H (%) | Haze (%) after abrasion test 1000 | 3000 (cycles) | 5000 | After water immersion test Adhesion | Tt (%) | H (%) | After thermal shock test Tt (%) | H (%) | After accelerated weathering test (after 500 hours) |
|---|---|---|---|---|---|---|---|---|---|---|---|---|---|---|---|
| 1 | (B) | I | 2.5 | 100/100 | 94.4 | 0.1 | 1.0 | 1.5 | 2.9 | 100/100 | 94.4 | 0.3 | 94.4 | 0.1 | Initial performance was maintained. |
| 2 | (B) | II | 2.3 | 100/100 | 94.0 | 0.1 | 1.0 | 1.5 | 2.9 | 100/100 | 94.0 | 0.3 | 94.0 | 0.1 | Initial performance was maintained. |
| 3 | (C) | III | 2.3 | 100/100 | 94.1 | 0.1 | 1.0 | 1.5 | 2.9 | 100/100 | 94.1 | 0.3 | 94.1 | 0.1 | Initial performance was maintained. |
| 4 | (C) | IV | 2.0 | 100/100 | 94.1 | 0.1 | 1.0 | 1.5 | 2.9 | 100/100 | 94.1 | 0.3 | 94.1 | 0.1 | Initial performance was maintained. |
| 5 | (D) | V | 2.5 | 100/100 | 94.1 | 0.1 | 1.0 | 1.5 | 2.9 | 100/100 | 94.1 | 0.3 | 94.1 | 0.1 | Initial performance was maintained. |
| 6 | (D) | VI | 3.5 | 100/100 | 94.1 | 0.1 | 1.0 | 1.5 | 2.9 | 100/100 | 94.1 | 0.3 | 94.1 | 0.1 | Initial performance was maintained. |
| 7 | (F) | I | 2.5 | 100/100 | 94.1 | 0.1 | 1.0 | 1.7 | 3.0 | 100/100 | 94.0 | 0.2 | 94.1 | 0.1 | Initial performance was maintained. |
| 8 | (G) | II | 2.5 | 100/100 | 94.1 | 0.1 | 1.0 | 1.5 | 3.5 | 100/100 | 94.1 | 0.2 | 94.1 | 0.1 | Initial performance was maintained. |
| 9 | (J) | I | 2.7 | 100/100 | 94.1 | 0.1 | 1.0 | 1.5 | 3.5 | 100/100 | 94.1 | 0.2 | 94.1 | 0.1 | Initial performance was maintained. |
| 10 | (K) | II | 2.6 | 100/100 | 94.1 | 0.1 | 1.0 | 1.5 | 3.5 | 100/100 | 94.1 | 0.2 | 94.1 | 0.1 | Initial performance was maintained. |
| 11 | (N) | I | 3.5 | 100/100 | 93.0 | 0.1 | 2.4 | 2.9 | 6.7 | 100/100 | 93.0 | 0.1 | 93.0 | 0.1 | Initial performance was maintained. |
| 12 | (N) | II | 2.5 | 100/100 | 93.0 | 0.1 | 2.6 | 2.9 | 5.7 | 100/100 | 93.0 | 0.1 | 93.0 | 0.1 | Initial performance was maintained. |
| 13 | (N) | III | 2.5 | 100/100 | 93.2 | 0.1 | 2.4 | 3.9 | 6.7 | 100/100 | 93.3 | 0.1 | 93.2 | 0.1 | Initial performance was maintained. |
| 14 | (O) | IV | 2.7 | 100/100 | 93.1 | 0.1 | 2.3 | 2.9 | 5.7 | 100/100 | 93.2 | 0.1 | 93.1 | 0.1 | Initial performance was maintained. |
| 15 | (P) | V | 2.6 | 100/100 | 93.1 | 0.1 | 2.1 | 2.9 | 5.5 | 100/100 | 93.2 | 0.1 | 93.1 | 0.1 | Initial performance was maintained. |
| 16 | (Q) | VI | 2.6 | 100/100 | 93.1 | 0.1 | 2.0 | 2.7 | 5.7 | 100/100 | 93.1 | 0.1 | 93.1 | 0.1 | Initial performance was maintained. |
| 17 | (S) | I | 2.8 | 100/100 | 92.8 | 0.1 | 2.1 | 2.9 | 6.5 | 100/100 | 92.5 | 0.1 | 92.5 | 0.1 | Initial performance was maintained. |
| 18 | (T) | II | 2.8 | 100/100 | 92.8 | 0.1 | 2.2 | 3.5 | 6.8 | 100/100 | 92.6 | 0.1 | 92.6 | 0.1 | Initial performance was maintained. |

Tt: Total light transmittance.
H: Haze.
*: These designations correspond to those given in the "Quantity of acidicgroups" column of Table 1.

TABLE 4

(Coating composition solution Nos. VII and VIII)

| Coating composition solution No. | Formulation | | Average number of hydrolyzable groups |
|---|---|---|---|
| VII | IPA-ST | 250.0 g | 3.900 |
| | GPTMSi | 40.0 g | |
| | TEOSi | 45.0 g | |
| | IPA | 282.0 g | |
| | 1/1000 N HCl | 49.4 g | |
| | Mg(ClO$_4$)$_2$ | 2.5 g | |
| VIII | IPA-ST | 33.3 g | 2.290 |
| | GPTMSi | 160.0 g | |
| | IPA | 373.4 g | |
| | 1/1000 N HCl | 108.0 g | |
| | Mg(ClO$_4$)$_2$ | 2.5 g | |

TABLE 5

(Evaluation of performance in Comparative Examples 3–7)

| Comp. | Coating composition | Thickness of coating | Initial performance | Haze (%) after abrasion test | Adhesion after water |
|---|---|---|---|---|---|

| Ex. No. | Substrate | solution No. | layer (μm) | Adhesion | Tt (%) | H (%) | 1000 | 3000 (cycles) | 5000 | immersion test |
|---|---|---|---|---|---|---|---|---|---|---|
| 3 | (A) in Table 1 | III | 2.5 | 0/100 | 94.1 | 0.1 | 2.2 | 4.2 | 18.5 | 0/100 |
| 4 | PMMA | III | 2.5 | 0/100 | 94.1 | 0.2 | 23.1 | 29.1 | 45.9 | 0/100 |
| 5 | Surface-hardened plate (Acrylite MR) | — | — | | 93.0 | 0.1 | 13.1 | 17.7 | 34.7 | — |
| 6 | Surface-hardened plate ((Dialite SH) | — | — | | 90.0 | 0.4 | 10.4 | 25.5 | 47.0 | — |
| 7 | Glass plate | — | — | | 93.0 | 0.1 | 1.4 | 2.4 | 3.5 | — |

What is claimed is:

1. A method of making abrasion-resistant shaped articles which comprises the steps of (a) providing a shaped article having a surface formed of a polymer having structural units derived from a multi-functional monomer containing two or more (meth)acryloyloxy groups in the molecule, (b) irradiating the surface of the polymer with ultraviolet light having a wavelength of 300 nm or less, (c) subjecting the irradiated surface to an alkali treatment, (d) coating the irradiated and alkali-treated surface with a coating composition consisting essentially of a silica polycondensate obtained by mixing (I) colloidal silica and (II) at least one hydrolyzable silicon compound selected from the group consisting of compounds of the following formulas (A) to (F)

$$SiR^1_a R^2_b (OR^3)_c \quad (A)$$

$$SiR^4_d R^5_e (OR^6)_f \quad (B)$$

$$SiR^7_g R^8_h (OR^9)_i \quad (C)$$

$$SiR^{10}_j R^{11}_k (OR^{12})_l \quad (D)$$

$$SiR^{13}_m R^{14}_n (OR^{15})_o \quad (E)$$

and $$SiR^{16}_p R^{17}_q (OR^{18})_r \quad (F)$$

wherein $R^1$, $R^2$, $R^3$, $R^5$, $R^6$, $R^8$, $R^9$, $R^{11}$, $R^{12}$, $R^{14}$, $R^{15}$, $R^{17}$ and $R^{18}$ in formulas (A) to (F) are hydrocarbon radicals of 1 to 15 carbon atoms or hydrocarbon radicals of 1 to 15 carbon atoms having an ether linkage or an ester linkage; $R^4$ in formula (B) is a hydrocarbon radical of 2 to 15 carbon atoms having an epoxy group; $R^7$ in formula (C) is a hydrocarbon radical of 1 to 15 carbon atoms having an amino group, $R^{10}$ in formula (D) is a hydrocarbon radical of 1 to 15 carbon atoms having a mercapto group; $R^{13}$ in formula (E) is a hydrocarbon radical of 2 to 15 carbon atoms having a vinyl group; $R^{16}$ in formula (F) is a hydrocarbon radical of 3 to 15 carbon atoms having a (meth)acryloyloxy group; where a, b, d, e, g, h, j, k, m, n, p and q are whole numbers of 0 to 3, c is equal to (4-a-b), f is equal to (4-d-e), i is equal to (4-g-h), l is equal to (4-j-k), o is equal to (4-m-n), and r is equal to (4-p-q);

in such a molar ratio that the average number of hydrolyzable groups calculated from the following equation (1) is within the range of 2.30 to 3.85, average number of hydrolyzable groups $$\text{average number of hydrolyzable groups} = \frac{4[I] + c[A] + f[B] + i[C] + l[D] + o[E] + r[F]}{[I] + [A] + [B] + [C] + [D] + [E] + [F]} \quad (1)$$

where [A] to [F] are the number of moles of the hydrolyzable silicon compounds of the formulas (A) to (F), respectively, present in the reaction mixture, [I] is the number of moles of the colloidal silica present in the reaction mixture, and c, f, i, l, o and r are the same whole numbers as defined above for the formulas (A) to (F);

and then subjecting them to cohydrolysis and polycondensation, and (e) curing the coating composition.

2. A method of making abrasion-resistant shaped articles as claimed in claim 1 wherein the polymer having structural units derived from a multifunctional monomer is obtained by polymerizing a monomer composition containing 30% by weight or more of the multifunctional monomer.

3. A method of making abrasion-resistant shaped articles as claimed in claim 1 wherein the coating composition additionally contains an alkyl (meth)acrylate polymer.

4. A method of making abrasion-resistant shaped articles as claimed in claim 1 wherein the coating composition is cured by the application of heat.

5. A method of making abrasion-resistant shaped articles as claimed in claim 1 wherein the hydrolyzable silicon compound (II) comprises at least one compound having the formula (E) or (F) and the coating composition is cured by exposure to actinic radiation.

* * * * *